United States Patent [19]

Kautsch

[11] Patent Number: 5,769,512
[45] Date of Patent: Jun. 23, 1998

[54] SLOTTED DRIVE WHEEL FOR ENDLESS GROUND ENGAGING BELTED TRACKS

[75] Inventor: Dewaine A. Kautsch, Dekalb, Ill.

[73] Assignee: Caterpillar Inc., Peoria, Ill.

[21] Appl. No.: 718,295

[22] Filed: Sep. 20, 1996

[51] Int. Cl.$^6$ .................................................. B62D 55/12
[52] U.S. Cl. ........................................... 305/199; 305/115
[58] Field of Search .................................. 305/115, 169, 305/184, 193, 195, 199

[56] References Cited

U.S. PATENT DOCUMENTS

| | | | |
|---|---|---|---|
| 1,487,340 | 3/1924 | Kroupsky | 305/184 |
| 1,549,594 | 8/1925 | Meinningen | 305/199 X |
| 1,922,357 | 8/1933 | Divney et al. | 305/115 X |
| 3,472,563 | 10/1969 | Irgens | 305/199 X |
| 5,190,363 | 3/1993 | Brittain et al. | 305/199 |

FOREIGN PATENT DOCUMENTS

| | | | |
|---|---|---|---|
| 12244 | 11/1955 | Germany | 305/199 |
| 42042 | 10/1925 | Norway | 305/195 |

OTHER PUBLICATIONS

Caterpillar World, No. 2 1988 Caterpillar Inc., back cover (p. 24).

*Primary Examiner*—Russell D. Stormer
*Attorney, Agent, or Firm*—Larry G. Cain

[57] ABSTRACT

Present drive wheels for use with an endless belted track fail to adequately disperse the debris at the interface between the drive wheel and the endless belted track. The present drive wheel includes a mounting hub having a plurality of cantilevered drive members. An opened ended slot is provided between each of the plurality of driving members to provide an effective escape path for debris.

16 Claims, 4 Drawing Sheets

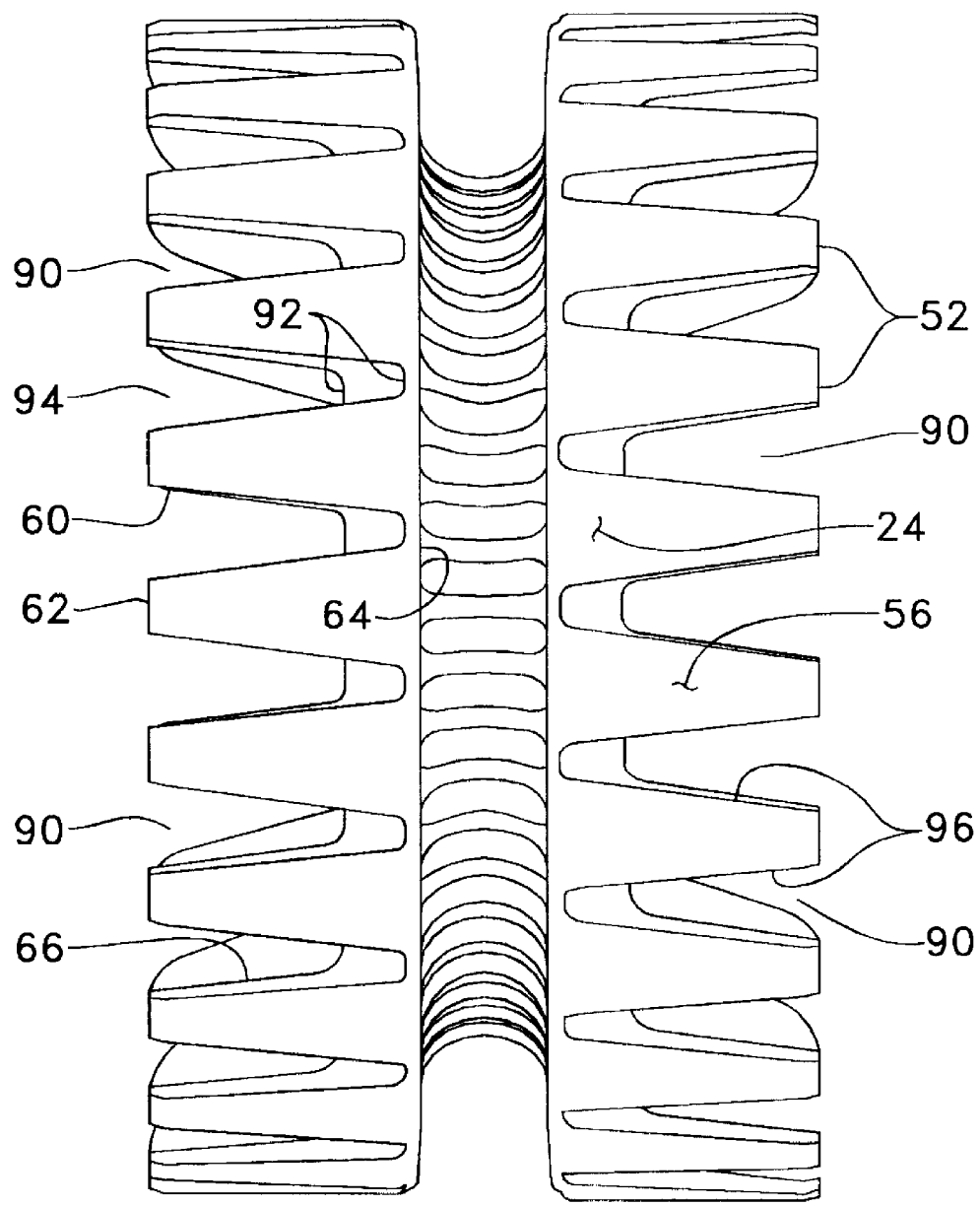
Fig_4_

SLOTTED DRIVE WHEEL FOR ENDLESS GROUND ENGAGING BELTED TRACKS

TECHNICAL FIELD

This invention relates generally to a drive wheel for a rubber belted track machine and more particularly to a slotted drive wheel having a plurality of openings therein for displacing debris between the interface of the drive wheel and the endless belted track.

BACKGROUND ART

The popularity and nearly universal acceptance of rubber tired tractors over steel track in agricultural use has stemmed primarily from steel track's relatively higher noise levels, higher initial cost, lower maximum travel speed, and inability to travel on improved roads without inflicting unacceptable damage to the road's surface.

The recent advent of rubber belted track, wherein a continuous rubber belted track is entrained about a pair of wheels, has overcome a majority of the objections of steel track. Problems encountered in actually reducing such belt system to practice include how to effectively frictionally drive such belt a drive wheel, how to maintain structural integrity of the belt and wheels, how to maintain the belt in lateral alignment with the wheels when the wheels are subject to large lateral loads, how to provide long life for the belt and wheels, and how to accommodate debris ingested between the wheels and belt while maintaining the frictional driving relationship therebetween without damaging either.

The present invention is directed to overcome one or more of the problems as set forth above.

DISCLOSURE OF THE INVENTION

In one aspect of the invention a work machine is comprised of a frame carrying an engine. A pair of drive wheels are provided, with each drive wheel being connected to one of the opposite sides of the work machine and each being operatively driven by the engine. A pair of idler wheels are also connected on opposite sides of the work machine. A pair of endless rubber belted tracks each have an inner drive surface and a plurality of centrally disposed guide lugs extending inwardly from the inner drive surface. Each track is entrained about the drive wheel and idler wheel on each side of the frame. A tensioning system operatively tensions each of the pair of endless belted tracks into frictional driven engagement with a respective one of the pair of drive wheels. The drive wheel includes a central hub, a pair of arms, and a first and a second plurality of cantilevered driving members. The pair of arms diverging radially outwardly from the hub and define a central guide groove between the arms for receiving the guide lugs of the belt. The first plurality of driving members extend laterally outwardly from one of the pair arms and the second plurality of driving members extend laterally outwardly from the other of the arms, each of the driving members being circumferentially spaced apart from its adjacent driving members to define an open ended slot between such adjacent driving members to dispel debris from between the track and the drive wheel.

In another aspect of the invention a slotted drive wheel is provided for frictionally driving an endless rubber belted track of a work machine. The drive wheel comprises a mounting hub disposed about a central axis and a pair of arms that diverge radially outwardly from the hub and define a central guide groove between the arms. The guide groove extends circumferentially about the drive wheel. A first plurality of cantilevered driving members extend laterally outwardly from one of the pair of arms and a second plurality of cantilevered driving members extend laterally outwardly from the other of the arms. Each of the driving members are circumferentially spaced apart from its adjacent driving members to define an open ended slot between such adjacent driving members.

BRIEF DESCRIPTION OF THE DRAWINGS

FIG. 4 is a top elevational view of the drive wheel.

BEST MODE FOR CARRYING OUT THE INVENTION

Figure 1:
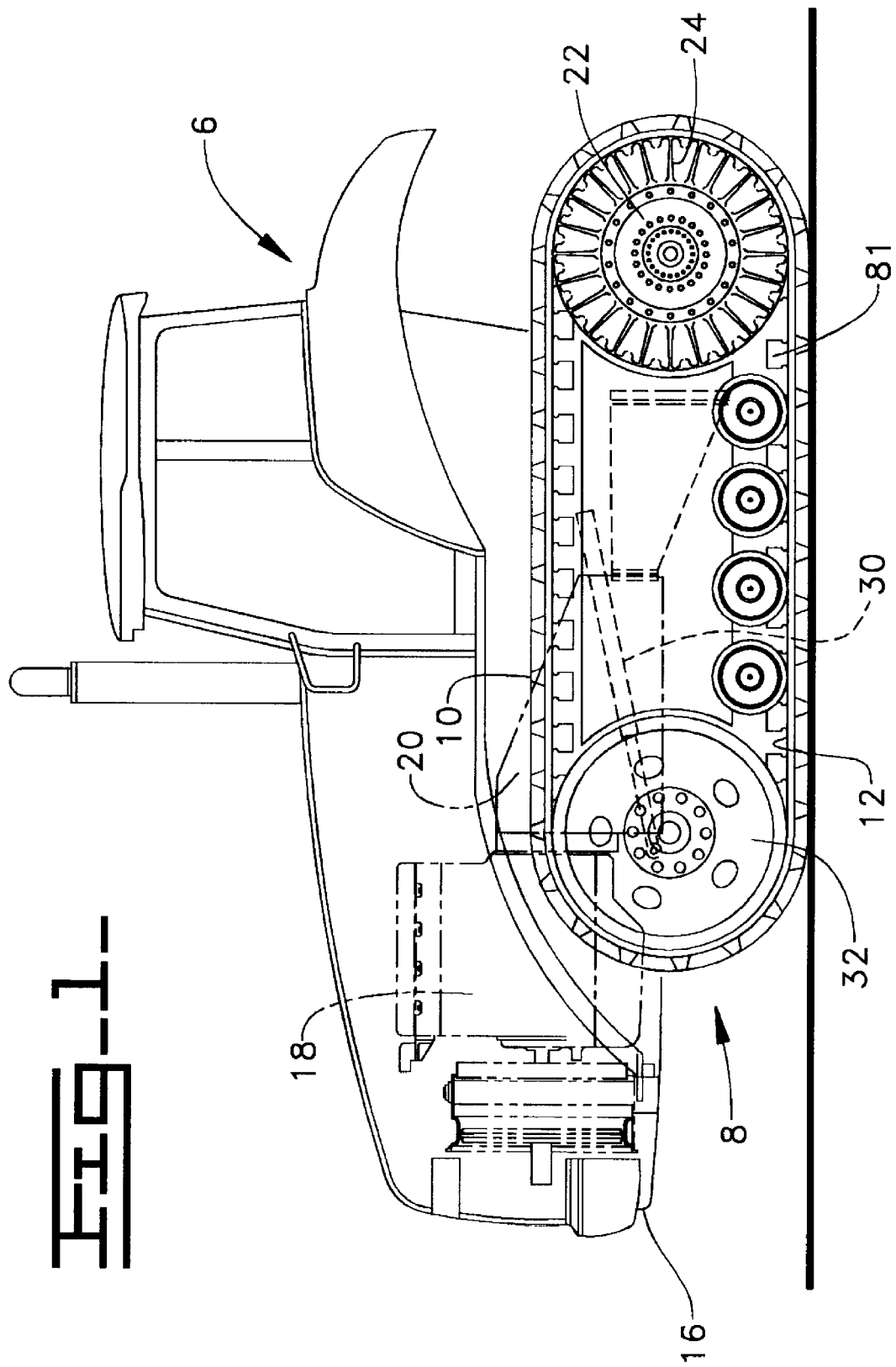
FIG. 1 is a side elevational view of the work machine with a drive wheel embodying the present invention.
Figure 3:
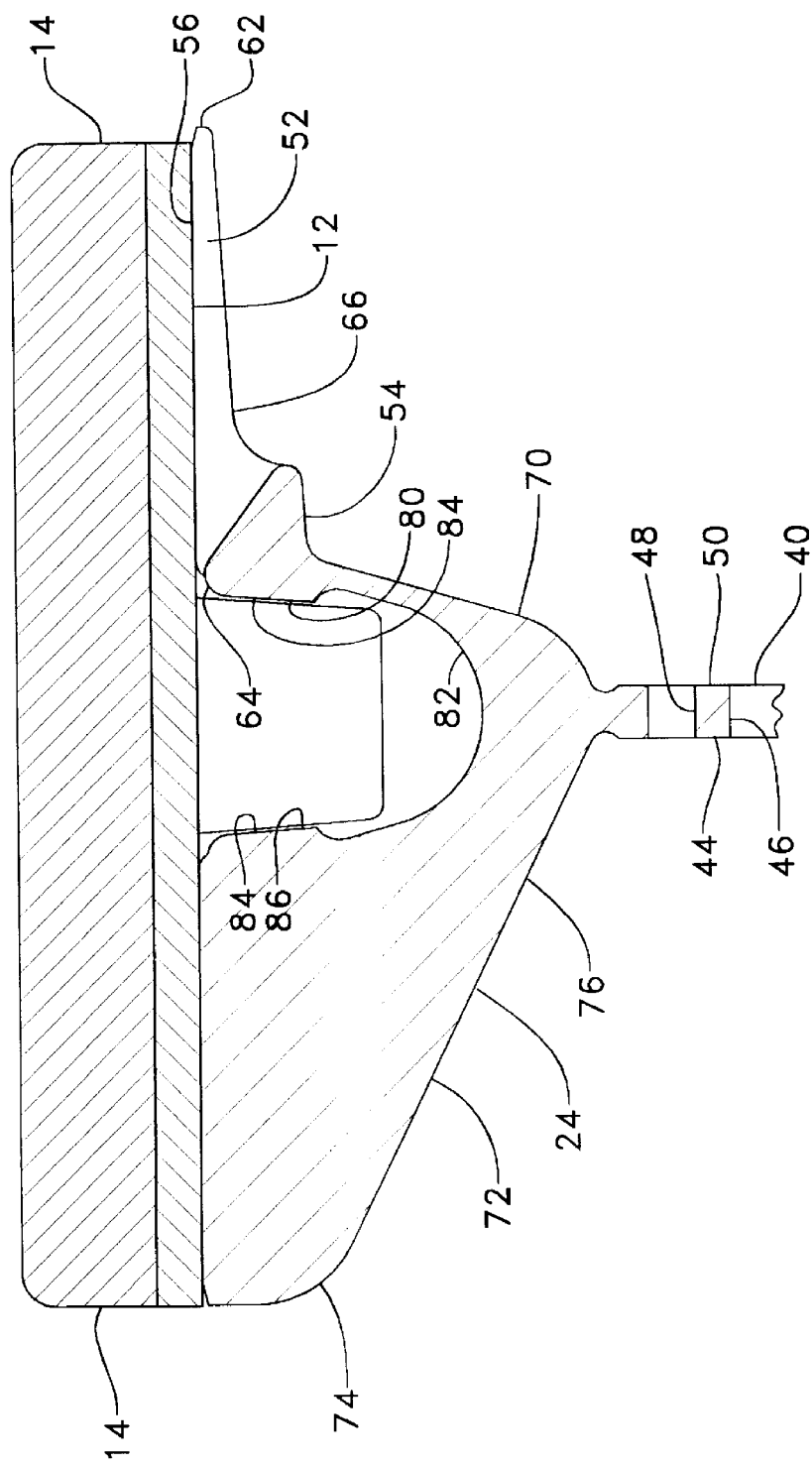
FIG. 3 is a sectional view of the interface between the drive wheel and an endless belted tracked track as taken along lines 3—3 of FIG. 2.

Referring to FIG. 1, a work machine 6, such as an agricultural tractor, is shown having a rubber belted track system 8. The rubber belted track system 8 utilizes a pair of endless rubber belted tracks 10, each having an inner surface 12 and a pair of sides 14, as best shown in FIG. 3. Each belted track is positioned on one of the opposite sides of the work machine 6. The work machine 6 includes a frame 16 and a propulsion system including an engine 18, a transmission 20 and final drive 22 for driving the rubber belted track system 8 in a conventional manner.

Figure 2:
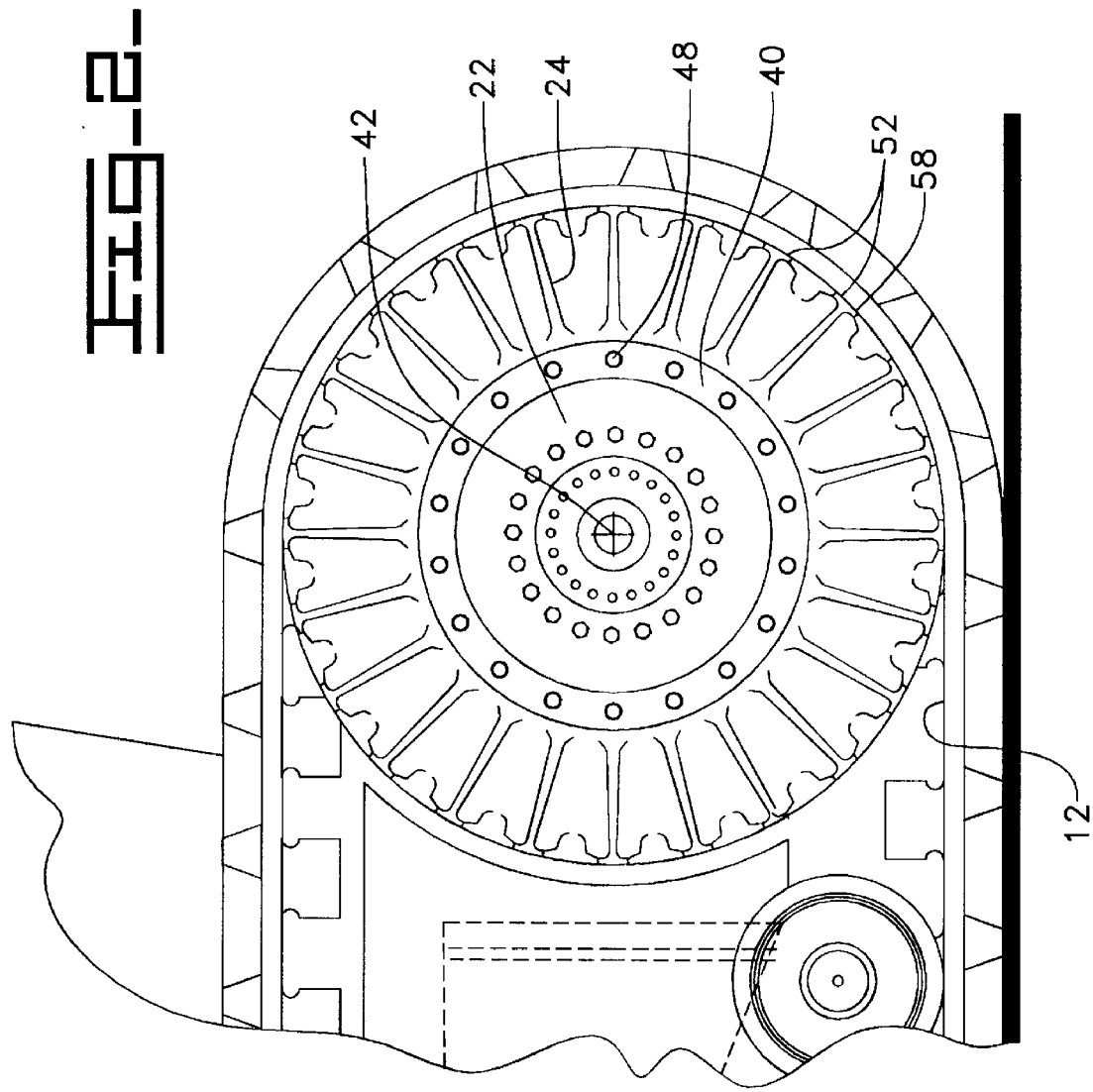
FIG. 2 is an enlarged side elevational view of the drive wheel depicted in FIG. 1.

In this application and as further shown in FIGS. 2, 3 and 4, each of the endless belted tracks 10 is frictionally driven by one of a pair of slotted drive wheels 24. Each drive wheel 24 is operatively connected to and powered by the engine 18 in a conventional manner. In as much as the pair of endless belted tracks 10 are substantially structurally and operatively identical, further reference will be made to only a single side of the belted drive system 8. The endless belted track 10 is entrained about the drive wheel 24 and an idler wheel 32 and is tensioned about the drive wheel 24 and idler wheel 32 by a conventional tensioning system, such as a hydraulic cylinder 30. In this application, the drive wheel 24 is positioned near the back of the work machine 6 and the idler wheel 32 is positioned toward the front of the work machine 6. A conventional suspension system operatively attaches the idler wheel 32 to the frame 16 of the work machine 6.

As further shown in FIGS. 2 and 3, the drive wheel 24 is preferably of a unitary construction formed from a metal casting, but, as an alternative, could be a fabrication. The drive wheel 24, in this application, has a generally cylindrical external configuration. A mounting hub 40 of the drive wheel 24 is centered about a central axis 42 and attaches to the final drive 22 at a first or mounting side 44 of the mounting hub 40. A circular opening 46 is centered about the axis 42 and, in this application, is adapted to be positioned around a portion of the final drive 22. The mounting hub 40 is attached to the work machine 6 in a conventional manner, such as by a hole pattern 48 within the mounting hub 40, and studs and nuts or bolts extending from the final drive 22. The mounting hub 40 further includes a second side 50 being positioned opposite the first side 44.

Extending from the mounting hub 40 are a pair of arms 54. Arms 54 diverge radially outwardly from the hub 40 and define an annular central guide groove 80 between the arms 54 that extends circumferentially about the drive wheel.

The drive wheel 24 also includes a first plurality of cantilevered driving members 52 extending laterally outwardly from one of the pair of arms 54 and a second plurality of cantilevered driving members 52' extending laterally outwardly from the other of the arms 54. Each of the driving members 52, 52' are circumferentially spaced apart from its adjacent driving members to define an open ended slot 90 between such adjacent driving members. As best seen in FIG. 4, the first driving members 52 are circumferentially staggered relative to the second driving members 52'.

In this application, each of the plurality of driving members 52, 52' define a driving surface 56 having a generally arcuate contour 58. Each driving member 52, 52' preferably has a generally trapezoidal configuration 60, but could be of a slightly different configuration as well. In this application, each of the plurality of driving members 52 has a first or blunt distal end 62 having a preestablished width. A second end or base 64 is located at the other end is connected to its respective arm of the mounting hub and is provided with a width greater than that of the preestablished width of the distal end. Each of the plurality of driving members 52, 52' has a preestablished thickness, which in this application is at least 12 mm. Additionally, in this application, the preestablished thickness of a cross-section of an individual plurality of driving members 52, 52' varies from the base 64 to the distal end 62. For example, each driving member 52, 52' is progressively thicker from the distal end 62 toward the base 64. And, each of the plurality of driving members 52, 52' has a support side 66 opposite the driving surface 56. Connecting and spanning between the arms 54 on each side 44,48 of the mounting hub 40 is a bridge member 70. A support member or gusset 72 is centered along the support side 66 of each of the plurality of driving members 52, 52', each gusset 72 extending from the distal end 62 to the respective first and second side 44,50 of the mounting hub 40.

As further shown in FIG. 3, each gusset has an arcuate portion 74 blendingly connecting with an angle portion 76 which, in turn, terminates in a blending connection at the respective first side 44 and second side 50 of the mounting hub 40. In this application, the angled portion 76 forms about a 30 degree angle with the support side 66. The gusset 72 has a preestablished minimum thickness.

The annular groove 80 is adapted to receive a plurality of guide lugs 81 of the endless belted tracked track 10 to guide the track and prevent its lateral displacement relative to the drive wheel. The annular groove 80 has a preestablished configuration. The groove 80 defines an arcuate portion 82 being formed by the mounting hub 40 and is also interposed the pair of arms 54. And, the groove 80 further defines a pair of tapered guide surfaces 84 disposed generally radially outward from the arcuate portion 82 and being formed by the bridge members 70 and the bases 64 of the plurality of driving members 52. The tapered surfaces 84 form a tapered portion 86 of the groove 80 and define a major length positioned at the outer extremity of the drive wheel 24 and a minor length located inboard thereof. In this application, the pair of tapered surfaces 84 are incline to the respective first side 44 and the second side 50 of the mounting hub 40 at about 4 degrees.

As shown in FIG. 4, slots 90 one on side between driving members 52 are positioned opposite the respective driving member 52' on the second side 48 of the mounting hub 40. In other words, the slots 90 and the driving members 52 on one side are staggered from the slots 90 and driving members 52' on the other side of the wheel. Each of the plurality of slots 90 has a preestablished configuration. In this application the preestablished configuration has a generally "V" shape with an apex thereof forming a truncated apex 92. For example, each slot 90 has a mouth portion 94 thereof positioned at the extremity of the slot 90 near the distal ends 62 of the plurality of driving members 52. The truncated apex 92 has a preestablished width and the mouth portion 94 has a preestablished width being larger in length than that of the preestablished width of the truncated apex 92. A pair of legs 96 extend between the mouth portion 94 and the truncated apex 92. The junction between the pair of legs 96 and the truncated apex 92 are blendingly connected. As an alternative, the pair of legs 96 do not necessary need to be a straight line, but could include a pair of line segments interconnecting the mouth portion 94 and the truncated apex 92. Regardless of the configuration of the pair of legs 96 however, the slot 90 should progressively increase in size from the truncated apex 92 toward the mouth portion 94.

Industrial Applicability

In operation, the work machine 6 with the rubber belted track system is used to extend the operating season and versatility of the work machine 6 and to reduce soil compaction caused the machine. For example, when the work machine 6 is operated in wet conditions, mud and other debris is collected or deposited along the inner surface 12 of the individual pair of endless belted tracks 10. As the endless belted tracked tracks are driven and rotate about the idler wheel 32 and the drive wheel 24, the debris is carried along to the interface of the endless belted track 10 and driving surfaces 56 of the plurality of driving members 52. If the debris is not at least partially removed from the interface, the drive wheel 24 will lose frictional driving contact with the endless belted tracked track 10 and the drive wheel 24 will spin relative to the endless belted track 10, causing slippage therebetween. Thus, the interface between the inner surface 12 of the endless belted tracked track 10 and the driving surface 56 of the plurality of driving members 52 of the drive wheel 24 needs to remain clean and in frictional engagement. The drive wheel 24 is constructed of a design to ensure such frictional engagement. For example, as the inner surface 12 of the endless belted tracked track 10 comes into contact with the driving surface 56 of the drive wheel 24, the configuration of the plurality of driving members 52, 52' and the open ended slots 90 are effective in keeping the interface clean and free of debris. Debris is forced along the inner surface 12 of the endless belted tracked track 10 and the driving surface 56 of the plurality of driving members 52, 52' generally from the guide lugs 81 outward from the base 60 toward the distal end 60. Since the driving members 52, 52' have a configuration in which the base 64 has a width that is greater than that of the distal end 62 as the debris moves outwardly from the guide lugs 81 along the endless belted tracked track 10, there is less surface to retain the debris. Additionally, since there is less surface, the resulting force of the tensioning system 30 further forces the debris from the interface and provides frictional engagement between the drive wheel 24 and the endless belted tracked track 10.

Functionally, the configuration of the plurality of slots 90 also assist in providing a frictional engaging interface. For example, each of the plurality of slots 90 have the generally "V" shape with the truncated apex 92 positioned respectively near the first side 44 and the second side 50 of the mounting hub 40. And, since the truncated apex 92 has the preestablished width and the mouth portion 94 has the preestablished width larger than that of the truncated apex 92 as the debris moves outwardly from the guide lugs 81 of the endless belted track 10, the size of the slot 90 opening becomes larger and the debris is more easily removed. Thus, the interface between the driving surface 56 of the driving member 52 and the inner surface 12 of the endless belted tracked track 10 are provided with a frictional driving interface. Because the slots 90 are open ended, there is no obstruction for debris to catch on and hinder its removal from the wheel.

Other aspects, objects and advantages of this invention can be obtained from a study of the drawings, the disclosure and the appended claims.

I claim:

1. A work machine comprising:

a frame carrying an engine;

a pair of drive wheels, each drive wheel being connected to one of the opposite sides of said work machine and each being operatively driven by said engine;

a pair of idler wheels connected on opposite sides of said work machine;

a pair of endless rubber belted tracks, each having an inner drive surface and a plurality of centrally disposed guide lugs extending inwardly from said inner drive surface and one of each pair of tracks being entrained about the drive wheel and idler wheel on each side of said frame;

a tensioning system operatively tensioning each of said pair of endless belted tracks into frictional driven engagement with a respective one of said pair of drive wheels; and said drive wheel including a central hub, a pair of arms, and a first and a second plurality of cantilevered driving members, said pair of arms diverging radially outwardly from said hub and defining a central guide groove between said arms for receiving said guide lugs of said belt, said first plurality of driving members extending laterally outwardly from one of said pair of arms and said second plurality of driving members extending laterally outwardly from the other of said pair of arms, each of said driving members being circumferentially spaced apart from its adjacent driving members to define an open ended slot between such adjacent driving members to dispel debris from between the track and the drive wheel.

2. The work machine of claim 1 wherein each of said driving members of the drive wheels has a generally trapezoidal configuration including a blunt distal end having a preestablished width, and a base at the other end connected to its respective arm of the mounting hub and having a width greater than that of the preestablished width of the blunt distal end.

3. The work machine of claim 2 wherein each of said slots has a generally "V" shaped configuration having a short truncated apex positioned near its respective arm of the mounting hub and the base of the plurality of driving members, and a wider open mouth portion at the distal end of the adjacent driving members.

4. The work machine of claim 2 wherein said first plurality of driving members are circumferentially staggered relative to said second plurality of driving members.

5. The work machine of claim 1 wherein each of said first and second plurality of driving members define a circumferentially disposed driving surface having a generally arcuate contour.

6. The work machine of claim 1 wherein each of said first and second plurality of driving members define a support side and have a support gusset centered along said support side extending generally from said distal end to said mounting hub.

7. The work machine of claim 1 wherein said drive wheel is of a unitary construction.

8. The work machine of claim 1 wherein said unitary construction is a metal casting.

9. A slotted drive wheel for frictionally driving an endless rubber belted track of a work machine, comprising:

a mounting hub disposed about a central axis;

a pair of arms diverging radially outwardly from said hub and defining a central guide groove between said arms, said guide groove extending circumferentially about said drive wheel;

a first plurality of cantilevered driving members extending laterally outwardly from one of said pair of arms and a second plurality of cantilevered driving members extending laterally outwardly from the other of said arms, each of said driving members being circumferentially spaced apart from its adjacent driving members to define an open ended slot between such adjacent driving members.

10. The a drive wheel of claim 9 wherein: each of said first and second plurality of driving members has a generally trapezoidal configuration including a distal end having a preestablished width, and a base at the other end connected to the respective arm of the mounting hub, and having a width greater than that of the preestablished width of the distal end.

11. The drive wheel of claim 10 wherein each of said slots has a generally "V" shaped configuration having a short truncated apex positioned near its respective arm of the mounting hub and the base of the plurality of driving members, and a wider open mouth portion at the end of the adjacent driving members.

12. The drive wheel of claim 11 wherein said first plurality of driving members are circumferentially staggered relative to said second plurality of driving members.

13. The drive wheel of claim 9 wherein each of said first and second plurality of driving members define a circumferentially disposed driving surface having a generally arcuate contour.

14. The drive wheel of claim 13 wherein each of said plurality of driving members define a support side and have a support gusset centered along said support side extending generally from said distal end to said mounting hub.

15. The drive wheel of claim 9 wherein said drive wheel is of a unitary construction.

16. The drive wheel of claim 15 wherein said unitary construction is a metal casting.

* * * * *